United States Patent
Dellock et al.

(10) Patent No.: US 10,493,903 B1
(45) Date of Patent: Dec. 3, 2019

(54) VEHICLE LIGHTING ASSEMBLY AND LIGHTING METHOD UTILIZING AN AMORPHOUS METAL SHELL

(71) Applicant: Ford Global Technologies, LLC, Dearborn, MI (US)

(72) Inventors: Paul Kenneth Dellock, Northville, MI (US); Stuart C. Salter, White Lake, MI (US); David Brian Glickman, Southfield, MI (US); Richard Gall, Ann Arbor, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/985,923

(22) Filed: May 22, 2018

(51) Int. Cl.
| | |
|---|---|
| *B60Q 1/56* | (2006.01) |
| *B60Q 1/26* | (2006.01) |
| *B60Q 1/30* | (2006.01) |
| *B62D 43/02* | (2006.01) |
| *B60R 13/00* | (2006.01) |
| *F21S 43/20* | (2018.01) |
| *B60Q 1/32* | (2006.01) |

(52) U.S. Cl.
CPC .......... *B60Q 1/2619* (2013.01); *B60Q 1/2696* (2013.01); *B60Q 1/323* (2013.01); *B60R 13/005* (2013.01); *F21S 43/20* (2018.01)

(58) Field of Classification Search
CPC .... B60Q 1/2619; B60Q 1/2696; B60Q 1/323; B60R 13/005; F21S 43/20
See application file for complete search history.

(56) References Cited

U.S. PATENT DOCUMENTS

| | | | |
|---|---|---|---|
| 6,889,456 B2 | 5/2005 | Shibata et al. | |
| 6,971,758 B2 | 12/2005 | Inui et al. | |
| 7,162,821 B2 * | 1/2007 | Venkataraman | G09F 13/04 40/541 |
| 7,549,776 B2 * | 6/2009 | Maeda | B60Q 1/323 362/362 |
| 7,631,998 B2 * | 12/2009 | Koike | F21V 7/22 362/538 |
| 8,702,290 B2 | 4/2014 | Yang | |
| 8,770,812 B2 * | 7/2014 | Kino | B60Q 1/323 362/23.17 |
| 9,791,111 B1 * | 10/2017 | Huang | F21K 9/20 |

(Continued)

FOREIGN PATENT DOCUMENTS

| | | |
|---|---|---|
| GB | 2474742 | 4/2011 |
| JP | 2005221661 | 8/2005 |
| WO | 2016181745 | 11/2016 |

OTHER PUBLICATIONS

Telford, The Case for Bulk Metallic glass,Materials Today vol. 7, Issue 3, Mar. 2004, pp. 36-43 (Year: 2004).*

*Primary Examiner* — Tracie Y Green
(74) *Attorney, Agent, or Firm* — Vichit Chea; Carlson, Gaskey & Olds, P.C.

(57) ABSTRACT

An exemplary vehicle lighting assembly includes, among other things, a shell that is an amorphous metal, and a lighting device that is held between the shell and a vehicle structure. An exemplary vehicle lighting method includes, among other things, covering at least a portion of a lighting device with a shell that is an amorphous metal, and transmitting light from the lighting device through at least one aperture in the shell.

18 Claims, 3 Drawing Sheets

(56) References Cited

U.S. PATENT DOCUMENTS

| | | | | |
|---|---|---|---|---|
| 2002/0101738 A1* | 8/2002 | Misaras | ............. | B60K 37/06 |
| | | | | 362/487 |
| 2005/0213351 A1* | 9/2005 | Yang | ............. | B60Q 1/323 |
| | | | | 362/633 |
| 2007/0211483 A1* | 9/2007 | Ando | ............. | B60Q 3/82 |
| | | | | 362/488 |
| 2008/0248222 A1* | 10/2008 | Ohara | ............. | B32B 15/01 |
| | | | | 428/34.6 |
| 2009/0251920 A1* | 10/2009 | Kino | ............. | B60Q 1/323 |
| | | | | 362/602 |
| 2009/0315389 A1* | 12/2009 | Seradarian | ............. | B60B 7/01 |
| | | | | 301/8 |
| 2010/0132232 A1 | 6/2010 | Frisch | | |
| 2010/0315826 A1* | 12/2010 | Anderson | ............. | G02B 6/001 |
| | | | | 362/511 |
| 2011/0007516 A1* | 1/2011 | Tsai | ............. | B60Q 1/2607 |
| | | | | 362/485 |
| 2014/0268852 A1* | 9/2014 | Foley | ............. | B60Q 1/0058 |
| | | | | 362/520 |
| 2015/0044084 A1* | 2/2015 | Hofmann | ............. | B32B 15/01 |
| | | | | 419/7 |
| 2015/0336517 A1* | 11/2015 | Vo | ............. | B60R 13/02 |
| | | | | 40/643 |
| 2016/0176359 A1* | 6/2016 | Sadri | ............. | B60R 13/005 |
| | | | | 296/191 |
| 2017/0087804 A1* | 3/2017 | O'Keeffe | ............. | B32B 5/02 |
| 2017/0091515 A1* | 3/2017 | Cao | ............. | G06F 1/1616 |
| 2019/0039510 A1* | 2/2019 | Chen | ............. | G09F 13/08 |

* cited by examiner

VEHICLE LIGHTING ASSEMBLY AND LIGHTING METHOD UTILIZING AN AMORPHOUS METAL SHELL

TECHNICAL FIELD

This disclosure relates generally to lighting areas of a vehicle, and, more particularly, to lighting the areas using a lighting assembly incorporating an amorphous metal shell.

BACKGROUND

Vehicles can include many illuminated areas. Vehicles can include lighting assemblies to provide the illuminated areas.

Some of the illuminated areas are primarily decorative, such as badges that can help to identify a model of the vehicle. Some vehicles, particularly luxury vehicles, may be equipped with one or more illuminated areas for enhancing the aesthetics of the vehicle. Other illuminated areas are instead, or additionally, used to enhance visibility.

SUMMARY

A vehicle lighting assembly according to an exemplary aspect of the present disclosure includes, among other things, a shell that is an amorphous metal, and a lighting device that is held between the shell and a vehicle structure.

In a further non-limiting embodiment of the foregoing assembly, the shell has at least one aperture that permits light from the lighting device to move through the shell.

In a further non-limiting embodiment of any of the foregoing assemblies, the shell provides a cavity, and the assembly further includes a lens disposed within the cavity between the lighting device and the at least one aperture.

In a further non-limiting embodiment of any of the foregoing assemblies, the lens is an insert molded lens.

In a further non-limiting embodiment of any of the foregoing assemblies, the lens includes an acrylic material.

In a further non-limiting embodiment of any of the foregoing assemblies, the lighting device includes at least one light emitting diode.

In a further non-limiting embodiment of any of the foregoing assemblies, the shell provides a cavity, and the lighting device is at least partially disposed within the cavity.

A further non-limiting embodiment of any of the foregoing assemblies includes a cover at least partially within the cavity. The cover encloses the lighting device within the cavity.

In a further non-limiting embodiment of any of the foregoing assemblies, the shell includes a base plate and one or more characters connected to the base plate with a plurality of structural divots.

A further non-limiting embodiment of any of the foregoing assemblies includes apertures in the shell between the base plate and a respective one of characters. The apertures each have a circumferential continuous perimeter provided by the base plate, the at least one of characters, and at least one of the structural divots.

In a further non-limiting embodiment of any of the foregoing assemblies, the characters of the shell are raised relative to the base plate of the shell.

In a further non-limiting embodiment of any of the foregoing assemblies, the base plate, the one or more characters, and the structural divots are portions of the same continuous monolithic structure.

In a further non-limiting embodiment of any of the foregoing assemblies, the amorphous metal is a metal alloy having a non-crystalline structure.

In a further non-limiting embodiment of any of the foregoing assemblies, the amorphous metal is a bulk metallic glass.

In a further non-limiting embodiment of any of the foregoing assemblies, the amorphous metal is an alloy of three or more elements. An atomic size of each of the elements differs by at least twelve percent from the other elements.

In a further non-limiting embodiment of any of the foregoing assemblies, the base is a scuff plate for a vehicle. The scuff plate is mounted within a door sill area of the vehicle.

A vehicle lighting method according to another exemplary, non-limiting aspect of the present disclosure includes, among other things, covering at least a portion of a lighting device with a shell that is an amorphous metal, and transmitting light from the lighting device through at least one aperture in the shell.

A further non-limiting embodiment of the foregoing method includes insert molding a lens within a cavity of the shell. The lens is positioned between the lighting device and the at least one aperture.

In a further non-limiting embodiment of any of the foregoing methods, the at least one aperture is positioned between a base of the shell and a character of the shell.

A further non-limiting embodiment of any of the foregoing methods includes mounting the shell to a door sill area of a vehicle to provide a scuff plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to illuminating areas of a vehicle. The area can be a scuff plate having an amorphous metal shell.

Figure 1:
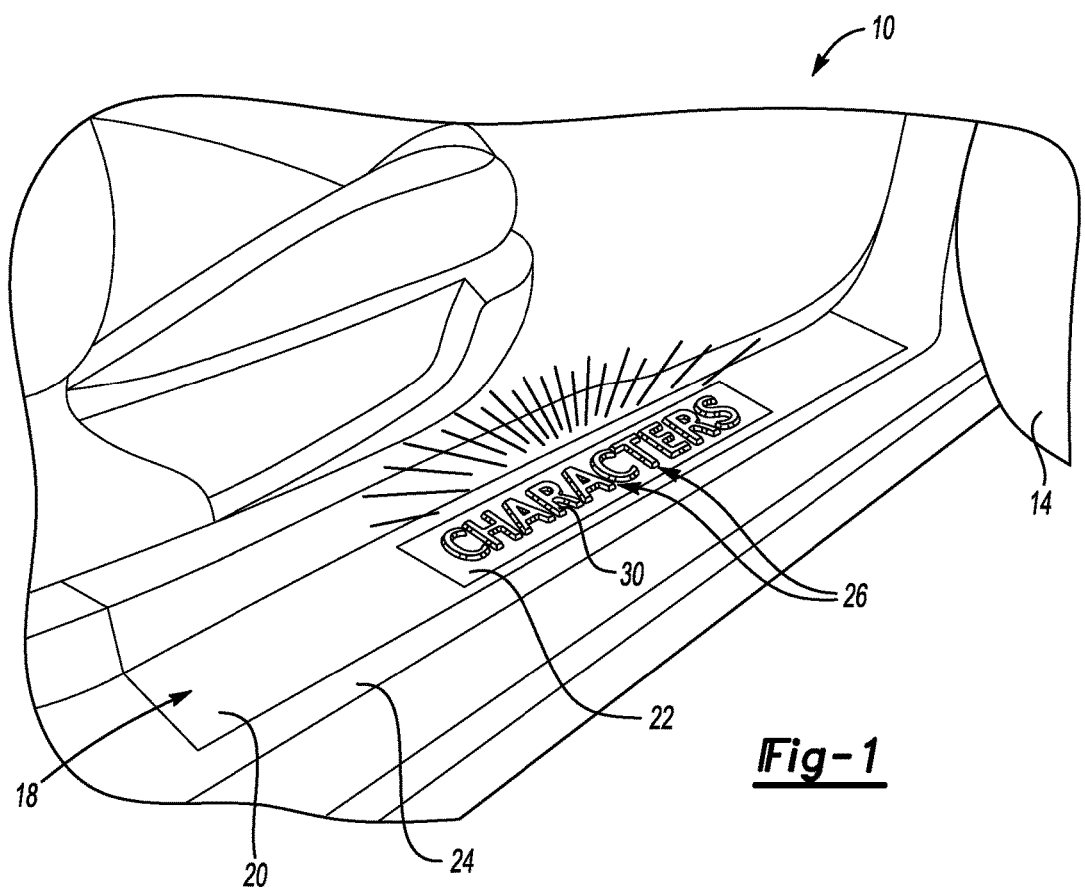
FIG. 1 illustrates a door sill area of a vehicle with a door in an open position.

Referring to FIG. 1, an exemplary vehicle 10 includes a door 14 and a door sill area 18. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The door sill area 18 is an area of the vehicle 10 that is frequently contacted. For example, a user can step on the door sill area 18 when entering and exiting a passenger compartment of the vehicle 10. The door sill area 18 can be exposed to various contaminants, such as gravel, road salt, etc. the user could introduce these contaminants to the door sill area 18.

The door sill area 18 includes a trim surround 20, a scuff plate 22, and a vehicle structure 24, here a vehicle body structure. The trim surround 20 and scuff plate 22 can protect some portions of the door sill area 18 from, among other things, wear and contaminants.

Figure 2:
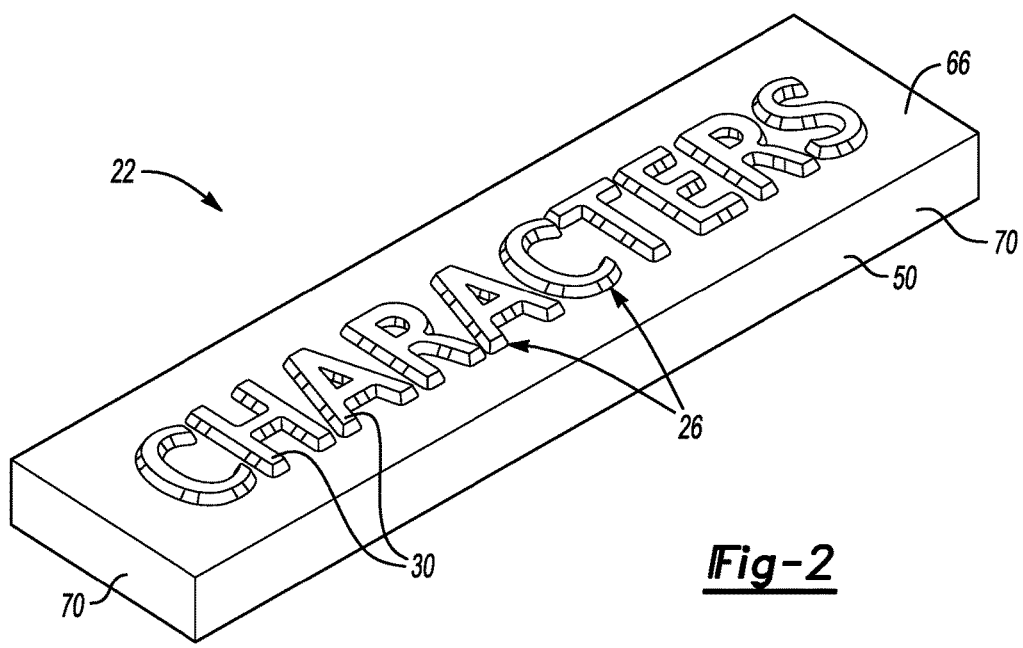
FIG. 2 illustrates a perspective view of a scuff plate from the door sill area of FIG. 1.
Figure 3:
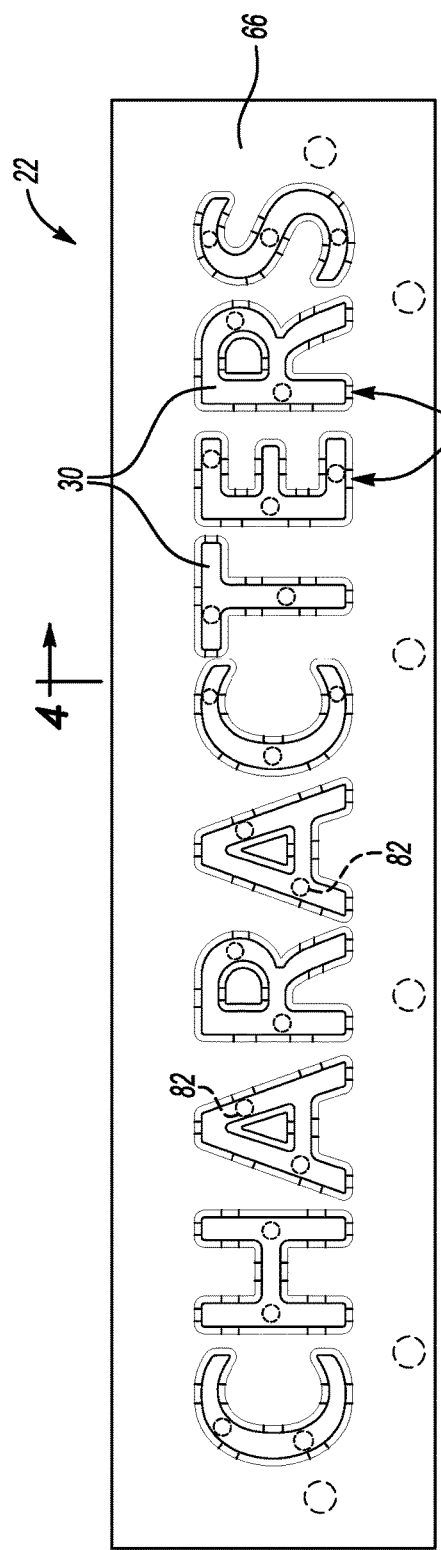
FIG. 3 illustrates a top view of the scuff plate of FIG. 2.
Figure 4:
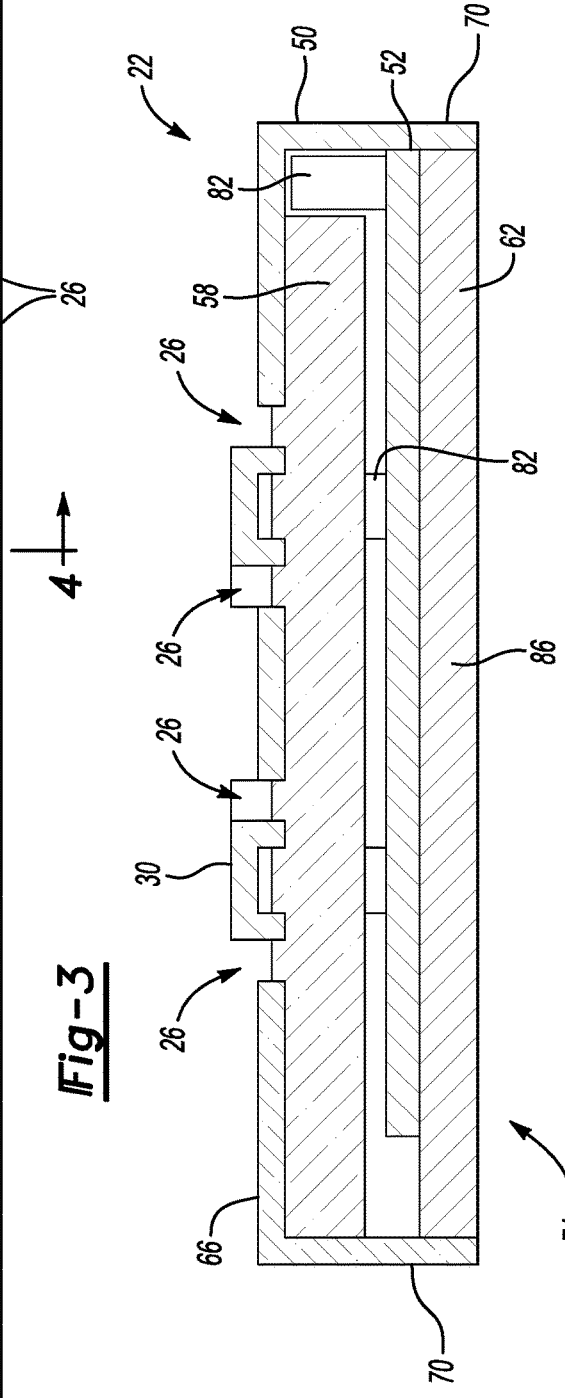
FIG. 4 illustrates a section taken along line 4-4 in FIG. 3.

Referring now to FIGS. 2-4, with continuing reference to FIG. 1, the example scuff plate 22 further provides the vehicle 10 with an illuminated area. In particular, the scuff plate 22 includes a plurality of apertures 26. Light emanating from the scuff plate 22 through the apertures 26 can provide an illuminated area that can assist the user when entering or exiting the passenger compartment.

The scuff plate 22 is an exemplary type of vehicle lighting assembly. In this example, the scuff plate 22 is a badge having characters 30 that help to identify and brand the vehicle 10.

The characters 30 of the scuff plate 22 could include alphanumeric characters representing, for example, a make of the vehicle 10. The characters 30 could instead, or additionally, include symbols or other decorative elements. Other scuff plates 22 could omit characters and include some other pattern of the apertures 26. The light, in this example, enhances the aesthetic appeal of the vehicle 10 by, among other things, illuminating characters 30 of the scuff plate 22.

In the exemplary non-limiting embodiment, the scuff plate 22 includes a shell 50, a lighting device 52, a lens 58, and a cover 62. Although described in connection with a scuff plate, the teachings of this disclosure could apply to other types of vehicle lighting assemblies, such a lighting assemblies used within door trim panels, within center stacks, in connection with decklids, or even on an exterior of the vehicle 10.

The shell 50 includes a base plate 66 and a plurality of walls 70 extending transversely from the base plate 66 to provide a cavity 74 of the shell 50. The base plate 66 is visible when installed within the trim surround 20 of the door sill area 18, whereas the walls 70, in this example, fit within the trim surround 20.

The apertures 26 and the characters 30 are provided within the base plate 66. In another example, the apertures 26, the characters 30, or both, could be at least partially within the walls 70.

The shell 50 is an amorphous metal, which has a non-crystalline, glass-like structure. Amorphous metals can be produced by rapidly cooling a molten material so that the atoms do not have time to crystalize. Rather than arranging themselves into repeating patterns of grains, the atoms of an amorphous metal can be considered "frozen" in a random, disordered structure after cooling. The material is then an amorphous metal that can have a smooth surface like glass. The material in the amorphous metal state can have fewer grain defects when compared to the same material that is not in the amorphous metal state. The material in the amorphous metal state can have higher strength, toughness, hardness, elasticity and corrosion and wear resistance when compared to the same material that is not in the amorphous metal state. A person having skill in this art could structurally distinguish an amorphous metal from other material compositions that are not amorphous metals.

The shell 50 can be molded using liquid injection molding. In some example, the amorphous metal can be a metal alloy, such as Nickel Chromium-based alloy. In another example, the amorphous metal can be a Zirconium-based alloy, such as the LM107 or LM105 products offered by Liquidmetal® Technologies Inc. The amorphous metal can also be an alloy sold under the brand name Vitreloy, including Vit 105, Vit 106a and Vit 601, which are available through Materion.

An exemplary method of molding the shell 50 can include melting crystalline rod shaped ingots under vacuum to provide a molten material. Next, the molten material is injected into a tool under pressure. The tool can be steel.

The tool is then induction heated using electrodes, for example, to a temperature that approaches the crystallization temperature of the material being molded. Once the tool is full, the electrodes are turned off allowing the material within the cavity to quickly cool.

The cured material, which is now an amorphous metal, is then transferred to a finishing station where gates and runners can be removed using conventional processes like laser, waterjet or Computer Numerical Control (CNC) machining to provide the shell 50. In some examples, no additional machining is required to provide the shell 50.

Amorphous metals can facilitate molding relative fine details in components, such as the apertures 26 and the characters 30 of the base plate 66. A component molded from an amorphous metal can have greatly reduced or non-visible knit lines when compared to other components that are not amorphous metals.

Areas of the molding assembly used to mold the shell 50 can include various contrasting surface finishes to provide areas of the shell 50 with a satin, bright, or polished surface finish. The contrasting surfaces finishes in the molding assembly can be created by micromachining, super finishing, graining, sand blasting, laser finishing, etc. In some examples, the characters 30 can have a surface finish differing from a surface finish of the base plate 66.

The shell 50 could be selectively painted or powder coated using conventional technology, if required.

The amorphous metal can be more resistant to corrosion, for example, than stainless steels. Due to the non-crystalline amorphous structure of the amorphous metal, the amorphous metal can have more elasticity than other cast materials and a relatively high yield strength that is similar to boron steel. Because the shell 50 is amorphous metal, the shell 50 can be highly dent resistant even at thicknesses of 0.3 millimeters or less.

Keeping the thickness of the shell 50 thin, say 0.3 millimeters or less, can reduce material costs. To facilitate the molding of the shell 50 at such thicknesses, the molding cavity for the shell 50 can be induction heated along with, if needed, a core of the molding tool. Molding the shell 50 in a hot tool reduces the viscosity of the molten material that will form the shell 50 and can and enable the molding of thinner sections.

Increasing the temperature of the tool used to mold the shell 50 can also reduce the temperature differential between the molten material that will form the shell 50 and a, typically steel, surface of the tool. If the cavity temperature is within 200 degrees Celsius of the molded material, a life of the tool may be extended to beyond 1,000,000 shots in some examples.

The amorphous metal provides a ceramic like structure that can provide a higher surface hardness than other metals lacking an amorphous structure. In some examples, the amorphous metal has a surface hardness that falls between a surface hardness of steel and ceramics. The relatively high surface hardness of the amorphous metal can mean that the shell is very scratch resistant without adding coatings.

The amorphous metal can be a bulk metal glass (BMG), which has Vickers hardness that is typically over 600. In a specific example, the Vickers hardness of the amorphous metal can be from 800 to 900. Stainless steels, in contrast to BMG, can have a Vickers hardness that is from 325-350.

With most pure elements, a cooling rate to achieve an amorphous state during molding can be 1,000,000 degrees Celsius per second. In a specific non-limiting embodiment of this disclosure, the amorphous metal is an alloy of three or more different elements, and an atomic size of each of the elements differs by at least twelve percent from the other elements. Using such combinations of elements has been found to reduce the cooling rate necessary to achieve an amorphous state during molding to as low as 1-100 degrees Celsius per second.

The lighting device 52, in the exemplary embodiment, includes at least one Light Emitting Diode (LED) 82 mounted on a Printed Circuit Board (PCB) 86. The LEDs 82 can be mounted behind the lens 58, along a lateral edge of the lens 58, or both.

When installed within the door sill area 18, the lighting device 52 is held between the shell 50 and the vehicle structure 24. In this example, the lighting device 52 positioned entirely within the cavity 74, along with the lens 58.

The example lens 58 is insert molded within the cavity 74. The lens 58 is thus an insert molded lens. In another example, the lens 58 is molded outside the cavity 74 and then, once cured, placed into the cavity 54. A person having skill in this art would be able to structurally distinguish an insert molded lens from a lens that is not insert molded.

The lens 58 can be a polymer based material. The material composition of the lens 58 can include an acrylic material. The material composition of the lens 58 could include a polycarbonate material The lens 58 diffuses light from the lighting device 52 that propagates through the apertures 26 in the shell 50. The lens 58 can help to avoid "hot spots" of light being visible through the apertures 26.

The cover 62 can be a potting compound, for example. The cover 62 covers the cavity 54 to enclose the lighting device 52 and the lens 58 within the cavity 54. The cover 62 can be partially, or fully, within the cavity 54. The cover 62 can seal the lighting device 52 and the lens 58 within the cavity 54. Electrical leads (not shown) can extend through the cover 62, or between the cover 62 and the shell 50 to power the lighting device 52.

Figure 5:
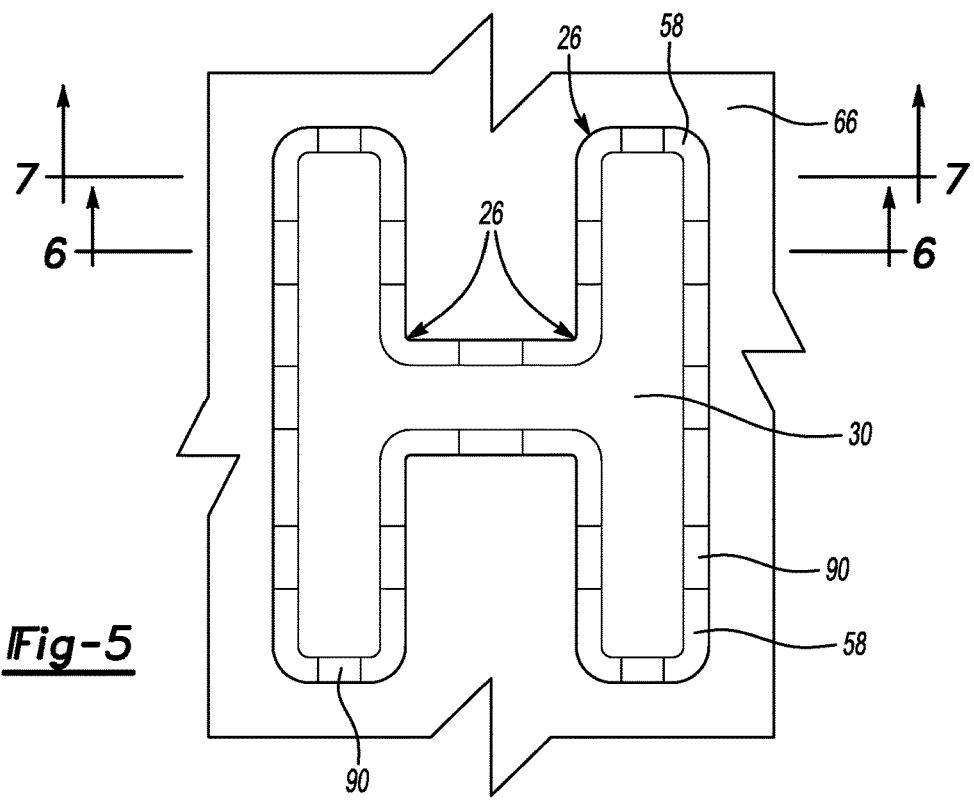
FIG. 5 illustrates a close-up view of a character of the scuff plate.
Figure 6:
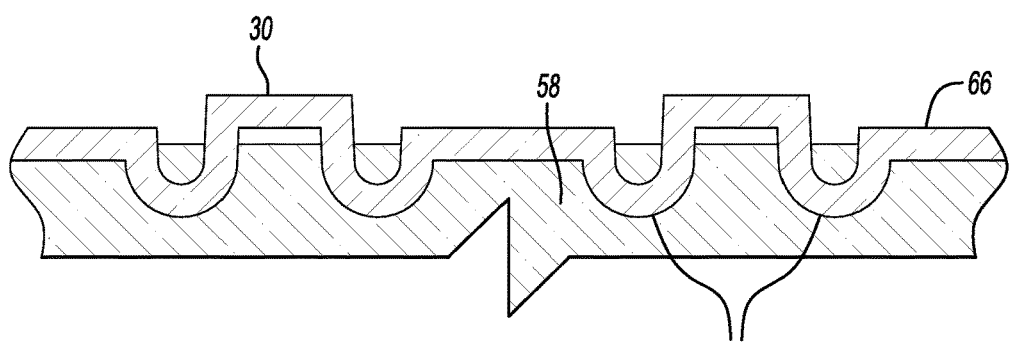
FIG. 6 illustrates a section view taken along line 6-6 in FIG. 5.
Figure 7:
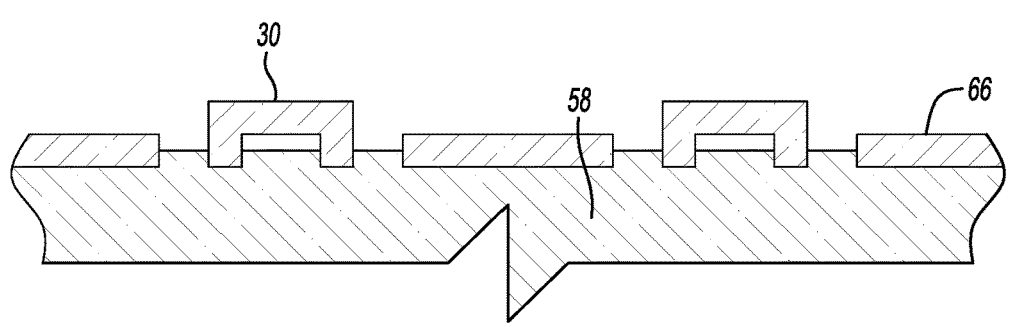
FIG. 7 illustrates a section view taken along 7-7 in FIG. 5.

With reference now to FIGS. 5-7 and continued reference to FIG. 4, the characters 30 of the shell 50 are raised relative to the base plate 66. In other examples, some or all of the characters 30 could instead be aligned with or recessed relative to the surrounding surface.

The apertures 26 are disposed about a perimeter of the characters 30 between the base plate 66 and the characters 30. Structural divots 90 connect the characters 30 to the base plate 66. The characters 30, the structural divots 90, the base plate 66, and the walls 70 are molded together as a continuous monolithic structure. That is, the characters 30, the structural divots 90, the base plate 66, and the walls 70 are all portions of the shell 50 and are all amorphous metal.

The apertures 26 are slots in this example. In another example, the apertures 26 could be openings other than slots.

In this example, the apertures 26 each have a circumferential continuous perimeter provided by the base plate 66, one of the characters 30, and at least one of the structural divots 90.

The structural divots 90 extend into the cavity 74 past the base plate 66 and the characters 30. The lens 58 can be overmolded about the structural divots 90 to hold the lens 58 relative to the shell 50.

In some examples, when the lens 58 is not insert molded, the shell 50 can include undercuts that are utilized to mechanically fasten the shell 50 to the lens 58.

The lens 58 could instead or additionally include molded-in locators and attaching features that extend past the PCB 86 and outside the cover 62. The locators and attaching features could be used to facilitate securing the scuff plate 22 to the vehicle 10.

Adhesive or tape could be used to attach the scuff plate 22 to the vehicle 10.

Features of some of the disclosed examples, include a lighting assembly, such as a scuff plate, that includes a shell of an amorphous material. A polymer based diffuser lens can be positioned behind a portion of the shell. The shell is relatively dimensionally precise facilitating the molding of sharp, crisp images within the shell.

The shell can have a luxurious chrome or metallic finishes with intricate slots and structural divots. The shell, due in part to its hardness, can be resistant to scuffs and scrapes that, for example, as stainless steel shell that is not an amorphous metal.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lighting assembly, comprising:
    a shell that is an amorphous metal, the shell including a base plate and one or more characters connected to the base plate with a plurality of structural divots; and
    a lighting device that is held between the shell and a vehicle structure.

2. The vehicle lighting assembly of claim 1, wherein the shell has at least one aperture that permits light from the lighting device to move through the shell.

3. The vehicle lighting assembly of claim 2, wherein the shell provides a cavity, and further comprising a lens disposed within the cavity between the lighting device and the at least one aperture.

4. The vehicle lighting assembly of claim 3, wherein the lens is an insert molded lens.

5. The vehicle lighting assembly of claim 3, wherein the lens comprises an acrylic material.

6. The vehicle lighting assembly of claim 1, wherein the lighting device comprises at least one light emitting diode.

7. The vehicle lighting assembly of claim 1, wherein the shell provides a cavity, and the lighting device is at least partially disposed within the cavity.

8. The vehicle lighting assembly of claim 7, further comprising a cover at least partially within the cavity, the cover enclosing the lighting device within the cavity.

9. The vehicle lighting assembly of claim 1, wherein a plurality of apertures are provided in the shell between the base plate and a respective one of characters, the apertures each having a circumferential continuous perimeter provided by the base plate, at least one of the characters, and at least one of the structural divots within the plurality of structural divots.

10. The vehicle lighting assembly of claim 1, wherein the characters of the shell are raised relative to the base plate of the shell.

11. The vehicle lighting assembly of claim 1, wherein the base plate, the one or more characters, and the plurality of structural divots are portions of the same continuous monolithic structure.

12. The vehicle lighting assembly of claim 1, wherein the amorphous metal is a metal alloy having a non-crystalline structure.

13. The vehicle lighting assembly of claim 1, wherein the amorphous metal is a bulk metallic glass.

14. The vehicle lighting assembly of claim 1, wherein the amorphous metallic material is an alloy of three or more elements, wherein an atomic size of each of the elements differs by at least twelve percent from the other elements.

15. The vehicle lighting assembly of claim 1, wherein the base is a scuff plate for a vehicle, the scuff plate mounted within a door sill area of the vehicle.

16. The vehicle lighting assembly of claim 1, wherein the base plate, the one or more characters, and the plurality of structural divots are each amorphous metals.

17. The vehicle lighting assembly of claim 1, wherein the plurality of structural divots are separate and distinct from the one or more characters.

18. A vehicle lighting assembly, comprising:
   a shell providing a cavity and having a base plate;
   one or more characters;
   a plurality of structural divots, the one or more characters connected to the base plate with the plurality of structural divots, wherein the base plate, the one or more characters, and the plurality of a structural divots are portions of a monolithic amorphous metal structure;
   a lighting device disposed at least partially within the cavity, the lighting device disposed between the shell and a vehicle structure, the shell having at least one aperture that permits light from the lighting device to move through the shell;
   a cover disposed at least partially within the cavity, the cover enclosing the lighting device within the cavity; and
   an insert molded lens disposed within the cavity between the lighting device and the at least one aperture.

* * * * *